Dec. 15, 1936.  V. VOORHEES  2,064,451
SEISMIC SURVEYING
Filed Aug. 15, 1935
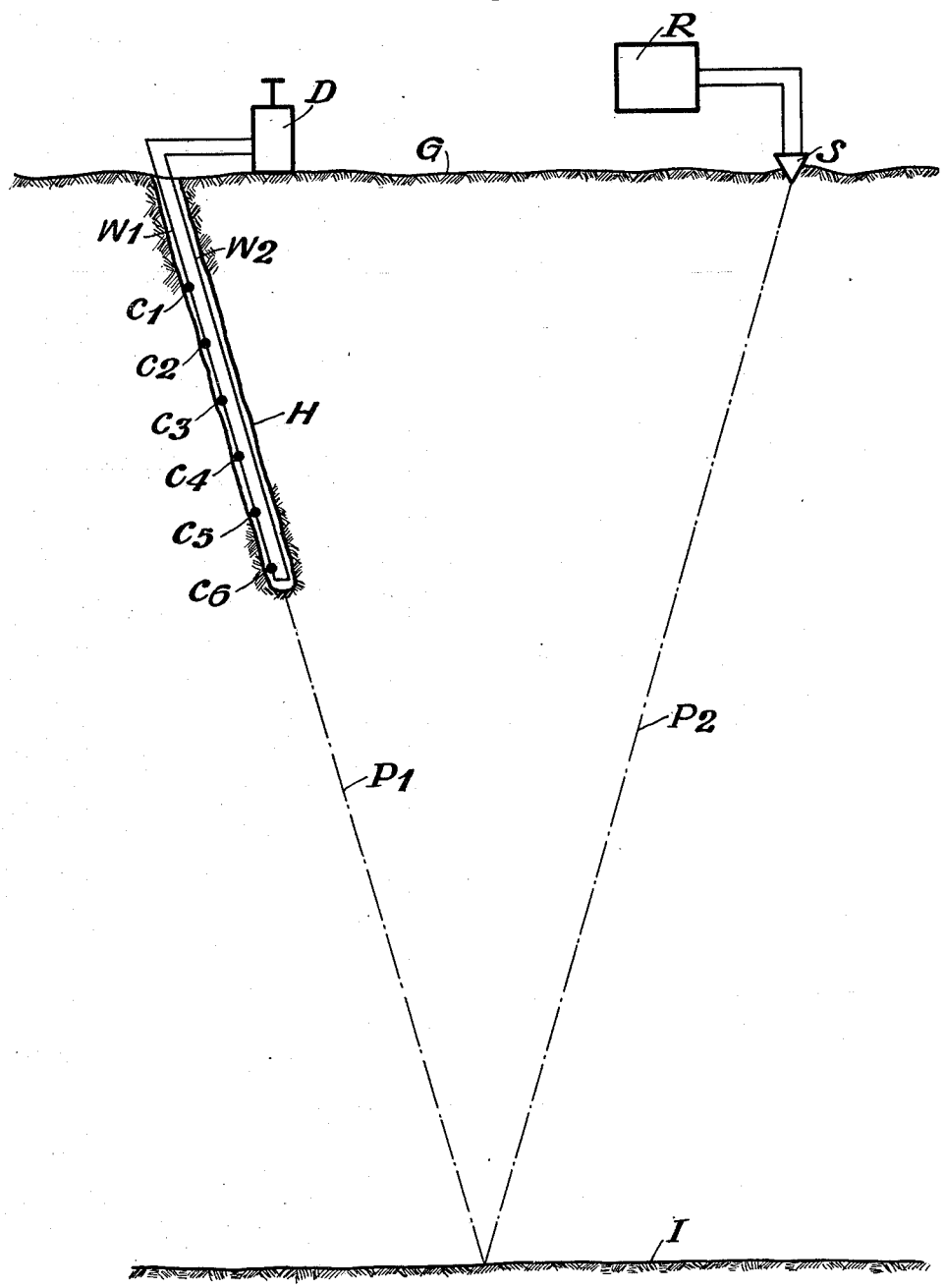
INVENTOR
Vanderveer Voorhees
BY
Bruce K. Brown
ATTORNEY Patented Dec. 15, 1936

2,064,451

UNITED STATES PATENT OFFICE 2,064,451

SEISMIC SURVEYING

Vanderveer Voorhees, Hammond, Ind., assignor to Standard Oil Company, Chicago, Ill., a corporation of Indiana Application August 15, 1935, Serial No. 36,374

11 Claims. (Cl. 181—0.5)

This invention relates to the art of seismic surveying and it pertains more particularly to new and useful improvements in the art of determining the position and slope of sub-surface geological formations by means of seismic waves, particularly reflected seismic waves. More particularly, it relates to a method of generating a sustained seismic wave having a single or predominating wave length and frequency and travelling in a generally downward direction.

One object of my invention is to provide a method which will facilitate the accurate determination of the position and slope of sub-surface geological formations. Another more specific object is to provide a method of generating a seismic wave which will permit the accomplishment of the aforementioned object. Other and more detailed objects of my invention will become apparent as the description thereof proceeds.

It is common practice in the art of seismic surveying to generate a seismic wave by means of an explosive charge and to pick up resulting waves reflected from a sub-surface stratum, surface of discontinuity or interface by means of one or more seismometers located at or near the surface of the earth. However, one difficulty with these prior art methods is that the explosive charge generates a seismic wave having a very rapidly decreasing amplitude. In other words, the wave generated is not a sustained wave but largely a shock wave. Furthermore, the wave thus generated is not a single wave of a definite frequency and wave length, but is made up of component waves having highly varying wave lengths and frequencies. These factors prevent the efficient use of tuning in the seismometers or in the recording circuits in order to identify one specific wave and eliminate extraneous waves.

The improvement which I have devised permits the generation of a sustained wave or in other words, a wave which has approximately a constant amplitude for a considerable number of cycles. Furthermore, by interference effects I eliminate, to a considerable extent, most of the frequencies generated by a single explosive charge and produce a wave which consists predominantly of a single frequency and wave length. This makes it possible by adjustment of the natural frequency of the seismometer or seismometers and/or by tuning the recording circuits, to eliminate, to a large extent, incidental waves and makes possible the more ready and accurate identification of the reflected wave. This idea is particularly adapted to cases in which there is only a single reflecting interface or at most a few widely separated reflecting interfaces.

I accomplish the above-mentioned results by using in place of a single explosive charge a plurality of explosive charges arranged in a linear relationship to each other in the direction which the desired seismic wave is to take.

The number of such charges may be adjusted to meet particular circumstances but I prefer to use at least three such charges and preferably at least five such charges.

In order to generate a single sustained wave it is important that the various charges used in accordance with my invention should be approximately equally spaced or that the spacing between each pair of adjacent charges should bear an integral relationship to other spacings between pairs of adjacent charges used at the same time. The reason for this is that I am interested in producing a sustained wave of definite frequency and in order to do this it is important that the spacing should be equal to or an integral multiple of the wave length of the seismic wave to be produced.

This and other features of my invention will become more apparent by consideration of a detailed description in conjunction with the accompanying drawing which forms a part of this specification and which shows in diagrammatic fashion one preferred embodiment of my invention.

Referring now more particularly to the drawing, it will be seen that a well or drill hole H which may suitably be 80 to 500 feet in depth is drilled from the surface of the ground G. This drill hole may be substantially vertical but is preferably aligned in the direction which the desired seismic wave is to take. In the drawing the drill hole H is shown considerably larger in proportion to the other features than it actually is in practice. A hole four to six inches in diameter is usually suitable.

In drill hole H are suspended a plurality of explosive charges $C_1$, $C_2$, $C_3$, etc. These charges may be suspended by wires or otherwise and are connected so as to be fired simultaneously. The charges may suitably be dynamite and may suitably be fired by the usual detonating caps (not shown). It is important that these charges be fired simultaneously and the simplest method of accomplishing this is to connect the detonating caps in a single electrical circuit. As shown, the charges (or rather their detonating caps) are all connected by a single wire $W_1$. The charges may suitably be supported in the drill hole H by means of this wire $W_1$ or separate supports may be used. The wire $W_1$ and also a return wire $W_2$ are connected to a conventional detonator D which is used to detonate all of the explosive charges $C_1$, $C_2$, $C_3$, etc., simultaneously.

As previously stated, each adjacent pair of explosive charges is separate by a distance equal to or an integral multiple of the desired wave length. Thus, when these charges are detonated simultaneously the result is a wave which is sustained for a considerable period of time since an impulse is given to the wave at points corresponding to each other in each of various cycles of that wave.

Although each of the explosive charges $C_1$, $C_2$, $C_3$, etc., generates a seismic wave which is a composite of various waves of various frequencies and wave lengths, the spacing of the explosive charges corresponds to only one frequency or wave length or at least only to a set of integrally related frequencies or wave lengths. All other waves tend to be cancelled out by interference effects and the result is a seismic wave which is not only sustained for a considerable period of time but which is a relatively "pure" wave consisting in large measure of a single frequency and wave length.

In order to produce the maximum amount of transmissible seismic energy, it is preferable that the spacing of the various explosive charges correspond to the wave length of that pure component having the largest amplitude. This optimum wave length will vary with various factors, particularly with the nature of the geological formation through which the drill hole H passes and can best be determined by experiment. The ideal spacing is the one which will give the maximum amount of transmissible energy as determined by the effect on the seismometer or seismometers. In other words, when various tunings of the receiving and/or recording instruments are tried with the corresponding spacing of charges one will be found which gives best results and this will correspond in general to that pure component having the greatest amplitude.

The desired wave length will be equal to the speed of the main component of the seismic wave in the geological structure through which drill hole H penetrates, divided by the frequency of this main component. Once a desired frequency is chosen and the receiving and/or recording instruments are tuned to it, the optimum spacing (or in other words the wave length) will vary directly with the speed of travel of the seismic wave through the given formation. In other words, the spacing will be greater for hard, dense formations than for softer and less dense formations.

The wave length of a wave of the desired frequency will, of course, vary from medium to medium and if the charges $C_1$, $C_2$, $C_3$. etc. are not all in the same geological formation the spacing should be varied to correspond with the wave length of the desired wave in the particular formation in which the charges are placed.

I may suitably tune my instruments to receive preferentially a frequency of 75 cycles per second. This can be done by adjusting the natural frequency of a seismometer of the transducer type or by tuning the electrical recorder circuit or by both methods. When using this 75 cycle tuning, the wave length will be about 80 to 130 feet, depending on the nature of the formation in which the charges are fired. The spacing, or in other words the distance between adjacent charges, should be equal to or an integral multiple of this wave length. By using a greater frequency, the charges may be spaced closer together. Frequencies of 25 to 100 cycles per second are usually suitable.

The sustained and relatively "pure" seismic wave generated by the simultaneous detonation of these spaced charges travels in a generally downward direction along the path $P_1$ until it meets a reflecting formation or interface I. A portion of the wave is then reflected and follows the path $P_2$ to seismometer S. The effects of this received wave are then recorded by recorder R.

The structure of the detonator D, seismometer S and recorder R may suitably be in accordance with well-known prior art and need not be described in detail.

As will be seen from the drawing, drill hole H should preferably be drilled in the direction which the desired seismic wave is to take. In other words, a line drawn through charges $C_1$, $C_2$, $C_3$, etc. when extrapolated to intercept the reflecting formation or interface I should make the same acute angle with the reflecting formation or interface I as does the line between the point of interception and the seismometer S. Thus paths $P_1$ and $P_2$ will make the same acute angle with the reflecting formation or interface I and the charges $C_1$, $C_2$, $C_3$, etc. will lie along path $P_1$.

My invention, by permitting the use of a sustained reflected wave of a definite frequency, makes it possible to simplify the record since direct waves and other incidental waves will not have this sustained character and definite frequency and will be largely tuned out by the instruments. This makes it possible in many cases to use a single seismometer instead of a plurality of seismometers as has previously been necessary. However, it will be understood that a plurality of seismometers can be used in connection with my invention and that improved results will generally be obtained thereby.

When using a plurality of spaced seismometers there will be a number of paths instead of paths $P_1$ and $P_2$ and the direction in which the charges are aligned must be compromised.

It will be understood, of course, that charges $C_1$, $C_2$, $C_3$, etc. need not be accurately aligned with path $P_1$ but it is important that they be approximately aligned. Moreover, if the line drawn through charges $C_1$, $C_2$, $C_3$, etc. is not identical with path $P_1$ the spacing should be adjusted so that the component part of the wave travelling in the direction $P_1$ will be in phase for the desired frequency.

Two or more drill holes located fairly close together may be used in place of the single drill hole H and some of the charges may be placed at different levels in each hole. However, in this case the spacing between holes should be small as compared to the wave length of the desired wave.

The prime requisite is that each of the charges $C_1$, $C_2$, $C_3$, etc. should generate a wave which will be in phase with each of the other waves thus generated. Furthermore, of the various frequencies generated by each of the charges the one which is in phase for each of the various charges should be the frequency to which the receiving instruments are tuned. Preferably this should be the frequency corresponding to the greatest amplitude so that the maximum amount of transmissible seismic energy will be available. However, in some cases it is desirable to use a frequency somewhat greater than the above-mentioned theoretical optimum in order to reduce the spacing between charges and avoid the use of extremely deep drill holes.

In general, paths $P_1$ and $P_2$ will be close to the vertical and drill hole H may therefore be drilled vertically in most cases.

I am aware that the spacing and simultaneous firing of a plurality of charges has been used heretofore in seismic surveying but in the prior art these charges have been arranged in a substantially horizontal relationship to each other for various purposes entirely different from those of the present invention and the waves produced have not been of the type which are obtained in the practice of my invention. It has also been proposed to arrange a plurality of charges in vertical alignment and to fire them successively by sympathetic detonation but this procedure does not produce either a sustained wave or a "pure" wave and does not have the advantages of my invention.

While I have described my invention in connection with certain theories and examples it is to be understood that these are by way of illustration rather than by way of limitation and I am not to be bound thereby but only to the broadest valid scope of the appended claims in which I will define the novel features of my invention.

I claim:

1. A method of generating a sustained seismic wave for use in seismic surveying which comprises arranging a plurality of explosive charges in a substantially linear relationship to each other in the direction which the desired seismic wave is to take, the spacing between each adjacent pair of said charges being substantially integrally related to the spacing between other adjacent pairs of said charges, and simultaneously detonating said charges.

2. A method according to claim 1 in which at least three of said explosive charges are used.

3. A method according to claim 1 in which at least five of said explosive charges are used.

4. A method of generating a sustained seismic wave for use in seismic surveying by the reflection method which comprises arranging a plurality of explosive charges in a substantially vertical linear relationship to each other, the spacing between each adjacent pair of said charges being substantially integrally related to the spacing between other adjacent pairs of said charges, and simultaneously detonating said charges.

5. A method according to claim 4 in which at least three of said explosive charges are used.

6. A method according to claim 4 in which at least five of said explosive charges are used.

7. A method of seismic surveying which comprises arranging a plurality of explosive charges in a substantially vertical linear relationship to each other, the spacing between adjacent pairs of said charges corresponding to an integral multiple of the wave length of a seismic wave of desired frequency, simultaneously detonating said charges, and receiving and recording the reflected seismic waves generated by the detonation of said explosive charges.

8. A method of seismic surveying which comprises arranging a plurality of charges beneath the surface of the ground in a substantially linear relationship to each other in the direction which the desired seismic wave is to take, each adjacent pair of said charges being spaced to correspond with the wave length of the desired seismic wave, simultaneously detonating said charges and receiving and recording seismic waves generated by said charges and reflected by a sub-surface interface.

9. A method according to claim 8 in which the receiving and recording system is tuned to receive and record waves having a frequency corresponding to said wave length in preference to waves having other frequencies.

10. A method of seismic surveying which comprises drilling a hole from the surface of the ground in a generally downward direction, arranging a plurality of spaced explosive charges in said hole, each adjacent pair of said charges being spaced to correspond with the wave length of the desired seismic wave, arranging a seismometer near the surface of the ground at a short distance from said hole, the position and direction of said hole and the position of said seismometer being so related to each other that a line drawn through said charges and intercepting a sub-surface reflecting interface makes substantially the same acute angle with said reflecting interface as a line drawn between said point of interception and said seismometer makes with said reflecting interface, simultaneously detonating said explosive charges, receiving seismic waves generated by said explosive charges and reflected from said reflecting interface at said seismometer and recording the effects of said received waves.

11. A method according to claim 10 in which the receiving and recording system is tuned to receive and record waves having a frequency corresponding to said wave length in preference to waves having other frequencies.

VANDERVEER VOORHEES.